Sept. 13, 1938.  C. E. SACRE  2,129,786
CAGE
Filed Nov. 10, 1934   2 Sheets-Sheet 1
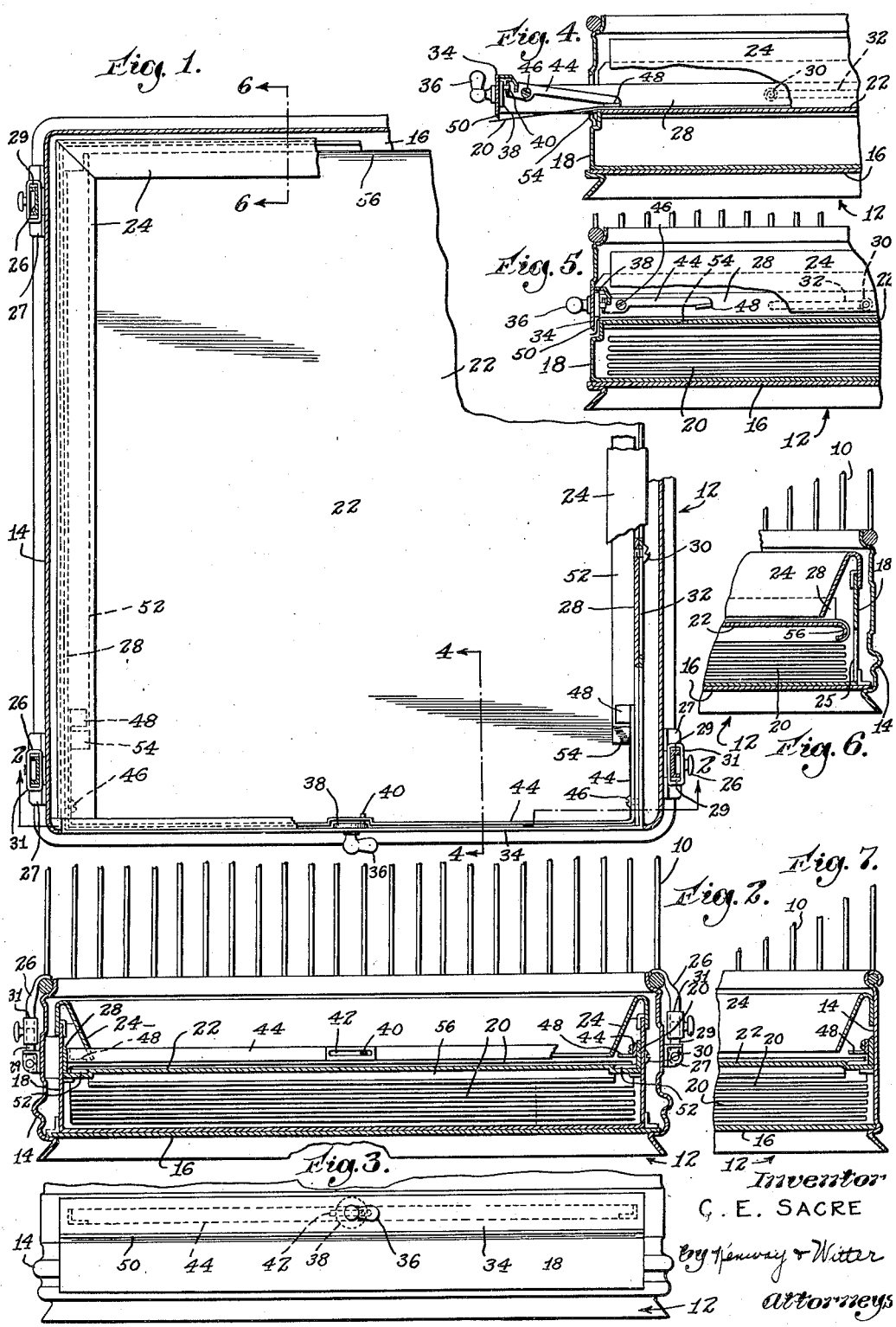
Inventor
C. E. SACRE
by Kenway & Witter
Attorneys Sept. 13, 1938.   C. E. SACRE   2,129,786
CAGE
Filed Nov. 10, 1934   2 Sheets-Sheet 2
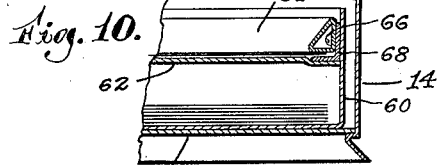
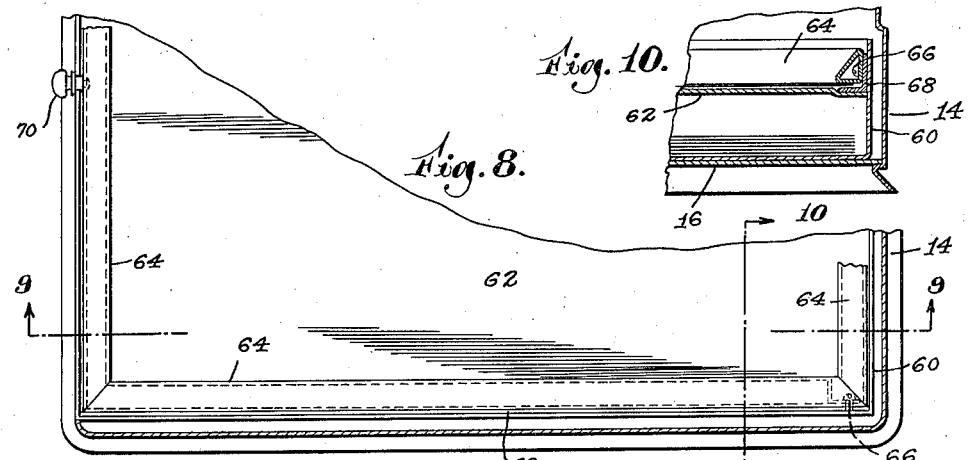
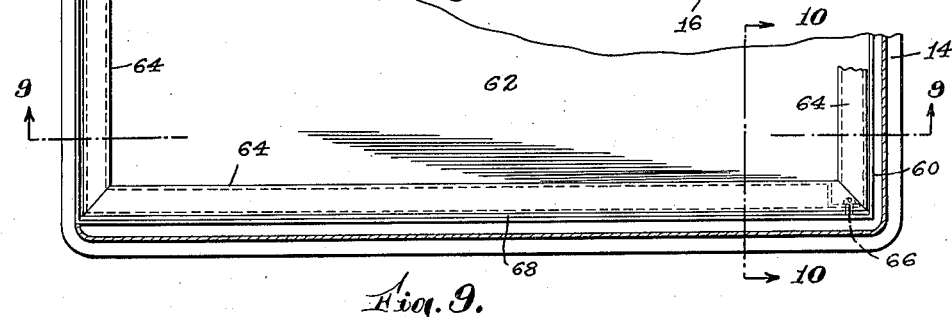
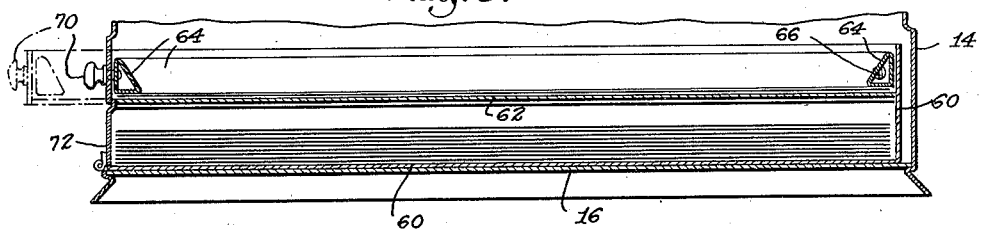
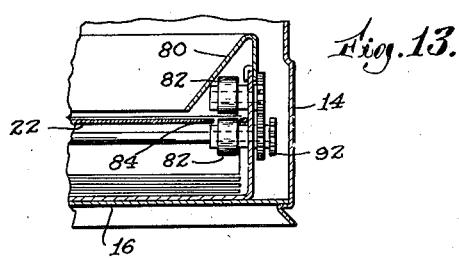
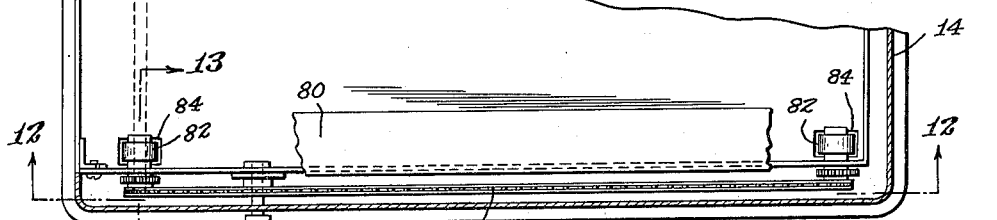
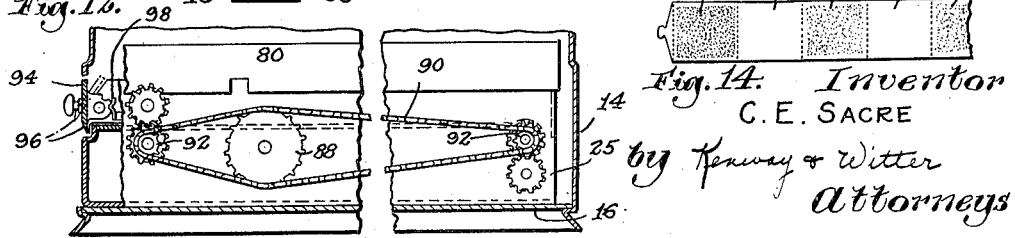
Inventor
C. E. SACRE
by Kenway & Witter
Attorneys Patented Sept. 13, 1938

2,129,786

UNITED STATES PATENT OFFICE 2,129,786

CAGE

Charles E. Sacre, Boston, Mass.

Application November 10, 1934, Serial No. 752,453

9 Claims. (Cl. 119—17)

This invention relates to cages, and more particularly to a novel sanitary bird cage bottom for bird cages and the like. The successful and healthful keeping of birds and small animals in captivity requires that the cages shall be kept clean and the animal, therefore, kept clean, healthy and attractive. However, with the cages in common use, this requirement of keeping the cage clean and attractive involves a considerable task and one which is both disagreeable and unpleasant. The primary object of my invention is the production of a new and novel cage for birds and the like, and more particularly a sanitary bird cage bottom, which can be easily and quickly cleaned and wherein the disagreeable features heretofore attending this task are eliminated.

My invention more particularly relates to a cage or cage bottom embodying a magazine for holding a supply of paper sheets and convenient means rendering the magazine and floor of the cage accessible, whereby the used paper sheet may be removed from the floor of the cage and a clean sheet supplied thereto from the magazine. The paper sheets may be in a convenient or desirable form, such as single sheets or sheets in strip form, fan-folded or rolled. In one form the invention may embody means for removing the used sheet manually and individually and substituting another sheet therefor from the magazine, and in another form means may be provided for conveniently performing this operation in a semiautomatic manner.

In accordance with the invention, my novel sanitary cage bottom may be built as a part of the cage or may be a removable unit adapted conveniently to be applied and attached to the bottom of the cage, all as hereinafter described.

These and other features of the invention will be best understood and appreciated from the following description of a preferred embodiment thereof, selected for purposes of illustration and shown in the accompanying drawings, in which Fig. 1 is a plan view of a cage bottom embodying my invention, taken on line 1—1 of Fig. 2;

Fig. 2 is a sectional view taken on line 2—2 of Fig. 1;

Fig. 3 is a front elevation of the cage bottom;

Fig. 4 is a fragmentary sectional view taken on line 4—4 of Fig. 1;

Fig. 5 is a similar view showing the parts in closed position;

Fig. 6 is a fragmentary sectional view taken on line 6—6 of Fig. 1;

Fig. 7 is a fragmentary sectional view similar to Fig. 2 but showing a modified form of the invention;

Fig. 8 is a fragmentary plan view of a cage bottom embodying a modified form of the invention;

Fig. 9 is a sectional view taken on line 9—9 of Fig. 8;

Fig. 10 is a sectional view taken on line 10—10 of Fig. 8;

Fig. 11 is a fragmentary plan view of a cage embodying a further modification;

Fig. 12 is a sectional view taken on line 12—12 of Fig. 11;

Fig. 13 is a fragmentary sectional view taken on line 13—13 of Fig. 11; and

Fig. 14 illustrates a novel paper strip adapted to be used with my invention.

Referring first to the form of my invention illustrated in Figs. 1-6, 10 indicates a cage body and 12 my improved sanitary cage bottom therefor as an independent unit adapted to be applied to the bottom end of the cage body 10. The unit 12 comprises a housing 14 having a bottom wall 16 carrying thereon a box-like member 18. The bottom portion of this member provides a chamber or magazine for a supply of paper sheets 20, shown in fan-folded strip form therein, and the top wall 22 of the magazine forms the floor of the cage. Mounted on the side and rear walls of the member 18 is an apron having a portion 24 tapering inwardly around the edges of the member and spaced from the floor 22. The top portion of this apron is arranged to fit neatly within the bottom end of the cage and convenient means, such as releasable latches, may be provided for attaching the bottom unit 12 to the cage. The latch illustrated comprises a hooked element 26 pivoted to a bracket 27 and pivotally movable between a pair of vertical elements 29 integral with the bracket. A sleeve 31 serves to hold the latch engaged, as shown in Fig. 2, when the sleeve is located over the elements 26 and 29. The latch may be released and pivoted backwardly by sliding the sleeve upwardly beyond the elements 29.

Mounted to slide along the inner faces of the side walls of the box 18 is a pair of guides 28, the guides being held in place by screws 30 passing through slots 32 in the side walls and threaded into the guides. The front ends of the guides are preferably integral with a connecting portion 34 carrying a rotary handle 36. The handle is connected to a disk 38 carrying eccentrically thereon a pin 40 engaged within a slot 42 in a U-shaped member 44. This member is pivoted to the side walls at 46 and carries a pair of presser feet 48 at its ends, rotation of the handle being adapted to pivot the member to engage its feet with horizontal portions 52 integral with the guides 28 and hereinafter described. The bottom edge of the piece 34 is sharpened to provide a knife 50 against which the paper strip may be torn off, as hereinafter described.

Cooperating with the presser feet 48 are horizontal plates 52, preferably integral with the guides 28 and seated in depressed portions of the floor 22, whereby the top surface of the plates 52 are flush with the floor. The front ends of these plates are preferably beveled off at 54, whereby the paper strip can ride freely thereover.

The use and operation of the mechanism above described is believed to be obvious and will now be described. The unit 12 may be removed from the cage by releasing the latches 26. The box 18 may then be removed and the magazine thus made accessible for refilling through the opening 25 with a new pack of sheets. The free end of the strip is carried from the magazine over a rounded portion 56 of the rear edge of the floor and from thence outwardly over the floor. The strip is the full width of the cage floor, whereby its edge portions extend beneath the overhanging apron 24 and cover the plates 52, it being apparent that the apron keeps refuse to the interior of the sheet and shields the plates 52 and presser feet 48 from the same.

Normally the end portion of the paper strip covers the floor and the parts are in the position shown in Fig. 5. When it is desired to clean the cage, the operator turns the handle 36 to engage the presser feet with the paper. The guide unit 34, 28 is then drawn outwardly to the position of Fig. 4, the sheet being drawn along therewith since it is gripped between the presser feet and plates 52. The presser feet are then released from the strip and the strip is drawn out by hand sufficiently to remove the used portion and substitute a new portion on the floor. The unit 28 is then returned to the position of Fig. 5, wherein the end of the strip is held firmly beneath the knife 50 against which the strip is torn off, thus removing the used portion, which may be thereupon thrown away. Thus the cage has been conveniently cleaned and a clean floor covering provided therein.

While I prefer to make my sanitary cage bottom as a unit removable from the cage, the same can be made as a part of the cage, as shown in Fig. 7, if desired. As thus constructed, the magazine may be made accessible by suitable doors, as shown in Fig. 9, or in any suitable and convenient manner.

In Figs. 8-10 I have illustrated a form of my invention using individual sheets. This construction embodies a magazine box 60 having a top wall 62 forming the cage floor. A rectangular frame 64 is pivoted at its inner end 66 to angle iron guides 68 similar to the guides 28, 52, which guides and frame may be drawn outwardly by means of a knob 70 mounted on the frame. The paper sheet rests on the floor and its peripheral edge is covered by the frame. In cleaning this cage, the unit 64—68 is drawn outwardly to a position wherein the frame can be lifted up about the pivots 66. When the frame is thus lifted, the used sheet is removed and another sheet substituted therefor. The magazine is accessible through a door 72.

In Figs. 11-13 I have illustrated another form of cage bottom adapted to use sheets in strip form, this form being generally similar to that shown in Figs. 1-6 and the magazine being accessible in like manner. The end of the paper strip is brought from the magazine over the rear edge of the floor and extends forwardly thereover. Mounted beneath the apron 80 adjacent to the side walls are four pairs of friction rollers 82 for engaging opposite sides of the strip, the floor being recessed at 84 for this purpose. The rollers may be rotated by a knob 86 connected with a gear 88 engaging a chain 90 extending over sprockets 92 of the rollers, which adjacent rollers are geared together. When it is desired to clean the cage, the pivoted door 94, carrying a knife 96, is pivoted to the broken line position, a spring 98 being adapted to hold the door in either of its two positions. The knob is then rotated to feed the paper outwardly until the used portion projects beyond the knife. The door 94 is then closed with the knife engaged against the strip and along which the strip can be torn off.

The magazine boxes in Figs. 8-10 and Figs. 11-13 are housed within a housing 14, the same as illustrated in Figs. 1-6, which housing may be detachably connected to the cage body in like manner as shown in Figs. 1-6, and the top portion of which housing 14 is depressed inwardly around its periphery for receiving the bottom end of the cage body.

While it is understood that any suitable sheet or strip of paper or other suitable material may be used, I have illustrated in Fig. 14 a preferred strip. This strip has alternate portions of plain and gravelled sections 100 and 102. The plain sections provide a suitable bathing floor for the bird and the gravelled sections provide a more permanent and somewhat natural flooring.

Having thus described my invention, what I claim as new and desire to secure by Letters Patent is:

1. In a bird cage or the like, a cage body, a magazine at the bottom thereof for holding a supply of paper sheets, means above the magazine providing a floor for the cage adapted to receive and support a paper sheet thereon, sliding guides within the cage above and adjacent to the floor, a frame pivoted to the guides and extending around the edges of the floor, means whereby the frame and guides may be drawn outwardly of the cage and the frame pivoted upwardly whereby to remove the used sheet from the floor, and means rendering the magazine accessible whereby a new sheet may be taken therefrom and substituted for the used sheet.

2. In a bird cage or the like, a cage body, a magazine at the bottom thereof for holding a supply of paper sheets in strip form, means above the magazine providing a floor for the cage adapted to receive and support a paper sheet thereon, means for guiding the strip over the floor, sliding guides within the cage above and adjacent to opposite edges of the floor, and gripping means carried by and cooperating with the sliding guides for gripping the used sheet on the floor and moving the same outwardly of the cage relative to said floor on which the sheet rests when the guides are thus moved.

3. The cage defined in claim 2, plus means for limiting the outward movement of the guides and a knife carried by and on the forward ends of the sliding guides against which the used end of the strip may be severed.

4. A bird cage bottom, comprising a housing having side walls crimped inwardly adjacent to the bottom edge thereof to provide an inwardly projecting ledge, a bottom wall resting on said ledge, a box resting on the bottom wall within the housing and having a chamber therein for holding a supply of sheet paper, a wall disposed over and covering the chamber and serving as a floor for the cage, means carried by the box and overhanging some of the edge portions of the floor and providing an inwardly and downwardly inclined apron closely adjacent to but spaced from the floor whereby a sheet may be placed on the floor with some of its edge portions extending beneath the apron, and means whereby a used paper sheet may be removed from the floor and a clean sheet supplied thereto from the chamber.

5. A bird cage bottom, comprising a housing having a bottom wall and side walls, a box-like magazine mounted within the housing and supported on the bottom wall, the magazine having a chamber therein for holding a supply of sheet paper, a wall carried by the magazine over and covering said chamber and serving as a floor for the cage, means overhanging some of the edge portions of the floor and providing an inwardly and downwardly inclined apron closely adjacent to but spaced from the floor whereby a sheet may be placed on the floor with some of its edge portions extending beneath the apron, and means whereby a used paper sheet may be removed from the floor and a clean sheet supplied thereto from the magazine.

6. The cage defined in claim 5 wherein the magazine is adapted to hold a supply of paper in strip form, means for conducting the strip from the magazine to and over the floor, and means for moving the strip along to remove the used end portion thereof from the floor and supply a clean portion from the magazine.

7. A bird cage bottom, comprising a housing having side walls, a bottom wall supported on the side walls, the housing having a chamber therein for holding a supply of sheet paper in strip form, a wall disposed over and covering the chamber and serving as a floor for the cage, means overhanging some of the edge portions of the floor and providing an inwardly and downwardly inclined apron closely adjacent to but spaced from the floor whereby a paper sheet may be placed on the floor with some of its edge portions extending beneath the apron, means for conducting the paper strip fom the chamber to and over the floor, and means for engaging edge portions only of the strip for moving the strip along to remove the used end portion from the floor and supply a clean portion from the chamber, the last named means including a movably mounted member having a straight edge adjacent to the exit passage for the strip, the passage being open when the member is in one position and closed when the member is in another position and the straight edge being adapted in the latter position to bind against the strip and serve as an edge against which the used end of the strip may be torn off.

8. A bird cage, comprising a top body portion open at its bottom end, a bottom portion comprising a housing having side walls, a bottom wall supported on the side walls, a removable box-like magazine in the housing, the magazine having a chamber therein for holding a supply of sheet paper in strip form, a wall disposed over and covering the chamber and serving as a floor for the cage, means on the magazine overhanging some of the edge portions of the floor and providing an inwardly and downwardly inclined apron closely adjacent to but spaced from the floor whereby a sheet may be placed on the floor with some of its edge portions extending beneath the apron, means whereby a used paper sheet may be removed from the floor and a clean sheet supplied thereto from the chamber, and means for detachably connecting the bottom end of the body portion to said bottom portion of the cage.

9. A bird cage bottom, comprising a housing having side walls crimped inwardly adjacent to the bottom edge thereof to provide an inwardly projecting ledge, a bottom wall resting on said ledge, a box resting on the bottom wall within the housing and having a chamber therein for holding a supply of sheet paper, a wall disposed over and covering the chamber and serving as a floor for the cage, and means carried by the box and overhanging the floor along portions of the edges thereof and providing an inwardly and downwardly inclined apron closely adjacent to but spaced from the floor whereby a sheet may be placed on the floor with some of its edge portions extending beneath the apron, the arrangement being such that the used paped sheet can be drawn outwardly from the floor and a new sheet substituted therefor from the magazine.

CHARLES E. SACRE.